US007818462B2

(12) United States Patent
Galang et al.

(10) Patent No.: US 7,818,462 B2
(45) **Date of Patent: *Oct. 19, 2010**

(54) CABLE INTERFACE

(75) Inventors: Einstein C. Galang, Daly City, CA (US); Demian Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/531,273

(22) Filed: Sep. 12, 2006

(65) Prior Publication Data

US 2007/0190857 A1 Aug. 16, 2007

Related U.S. Application Data

(63) Continuation-in-part of application No. 11/202,950, filed on Aug. 12, 2005, which is a continuation-in-part of application No. 10/254,485, filed on Sep. 24, 2002, now Pat. No. 6,941,395.

(51) Int. Cl.
*G06F 3/00* (2006.01)
*G06F 13/12* (2006.01)

(52) U.S. Cl. ............................ 710/1; 710/62; 710/66; 710/70

(58) Field of Classification Search .................. 710/65, 710/1, 62, 66, 70
See application file for complete search history.

(56) References Cited

U.S. PATENT DOCUMENTS

| | | | | |
|---|---|---|---|---|
| 5,594,491 | A * | 1/1997 | Hodge et al. | 725/103 |
| 6,134,373 | A * | 10/2000 | Strolle et al. | 386/9 |
| 2002/0031224 | A1* | 3/2002 | Basawapatna et al. | 380/211 |
| 2004/0136456 | A1* | 7/2004 | Ogden | 375/240.01 |
| 2006/0244528 | A1* | 11/2006 | Pickerd et al. | 330/126 |

OTHER PUBLICATIONS

Spencer Chin, Next-gen display standard emerges for PC, HDTVs, Dec. 20, 2005, EETIMES europe.*
Bill Lempesis, New DisplayPort Standard for PCs, Monitors, TV Displays and Projectors Moves from Promoter Group to Video Electronics Standards Association, Aug. 16, 2005, Business Wire.*
Extend HDMI 150' over CAT5, www.svideo.com/ext-hdtv-cat5.html, Sep. 3, 2009, pp. 1-3.

* cited by examiner

*Primary Examiner*—Niketa I. Patel
(74) *Attorney, Agent, or Firm*—LaRiviere, Grubman & Payne, LLP

(57) ABSTRACT

A method and apparatus for transmitting a signal to a remote location. The method splits the signal into a multitude of signals that are transmitted down cables. The split signals are collected into a single signal at the receiving end at the remote location. An apparatus for splitting the signals and collecting the split signals is illustrated.

12 Claims, 4 Drawing Sheets

CABLE INTERFACE

This application is a continuation in part application of and claims priority to application Ser. No. 11/202,950 entitled "HDMI CABLE INTERFACE" filed Aug. 12, 2005, which is a continuation in part application of and claims priority to application Ser. No. 10/254,485 entitled "DVI CABLE INTERFACE" filed Sep. 24, 2002, now U.S. Pat. No. 6,941,395.

TECHNICAL FIELD

This invention relates to interfaces for electrical devices. In particular, the invention relates to cable for use with digital display devices. With still greater particularity, the invention relates to interconnect boards for connecting an interface to multiple cables.

BACKGROUND ART

One interface is the Digital Visual Interface (DVI). One variant of this interface is the High-Definition Multimedia Interface, a standard digital interface signal for HDTVs and advanced CE displays, (HDMI). The HDMI is a display interface developed in response to the proliferation of digital flat-panel displays. The HDMI interface is becoming more prevalent and is expected to become widely used for digital display devices, including flat-panel displays and emerging digital CRTs. The digital HDMI connector has nineteen pins that can accommodate TMDS and optional CEC channel links as well as the VESA Enhanced DDC and EDID services. The HDMI specification defines two types of connectors. The standard HDMI cable attachable to the connector is a nineteen conductor cable. HDMI cables are expensive and cannot be used for great lengths. The longest commercially available HDMI cable is forty-eight feet in length (48'). The only available alternative to use of HDMI cables is double digital analog conversion. The digital signal from the computer must be converted to an analog signal for the analog VGA interface, then converted back to a digital signal for processing by the flat-panel display. This inherently inefficient process takes a toll on performance and video quality and adds cost. In contrast, when a display is directly connected to a digital interface, digital-to-analog conversion is not required. Additionally, when other variants are utilized, similar issues arise.

A suitable HDMI cable arrangement is an essential element of a new generation of electronic devices including digital television, High Definition Television (HDTV) and large data monitors. Such devices will need long cables as the display is often removed from the electronics.

Additionally, there is a need to address the current move to merge technology capabilities for television, CRT's, etc with those of the computer, PC, etc. Two such interfaces are the interface known as DisplayPort and the unified display interface (UDI).

DISCLOSURE OF THE INVENTION

A problem has arisen in HDMI technology where a wide bandwidth digital signal is required to traverse a long distance. The bandwidth required to display SXGA is 83 MHZ. If a greater resolution, such as for HDTV, is desired, the bandwidth requirement will be correspondingly larger. If standard nineteen conductor cable is used, the crosstalk and radiation along with capacitive degradation of signal, makes the use of long length HDMI cables untenable. If conventional coaxial cable is used to reduce these problems, a bundle of nineteen cables is required. Accordingly, there is a long-standing demand for an HDMI cable system capable of long length and reasonable cost.

The invention makes extensive use of existing time proven cabling methods. A standard HDMI interface connector of one gender is connected to a custom connector card. The card connects the nineteen output connections of the interface to a plurality of twisted pair cables. A similar card connects the twisted pair cables to an HDMI connector of the opposite gender.

The inventive system allows connection of wide bandwidth digital signal devices such as displays to a remote source such as a television receiver or computer. This is accomplished with time-tested components at minimal cost. The invention may be used to string the twisted pair cables through walls with a converter at each end attachable by HDMI pigtail to the components.

The inventions system further allows connection of devices such as displays, including PC and notebook monitors, HDTV's and projectors to host computers which incorporate DisplayPort and UDI interfaces.

BEST MODE FOR CARRYING OUT THE INVENTION

Figure 1:
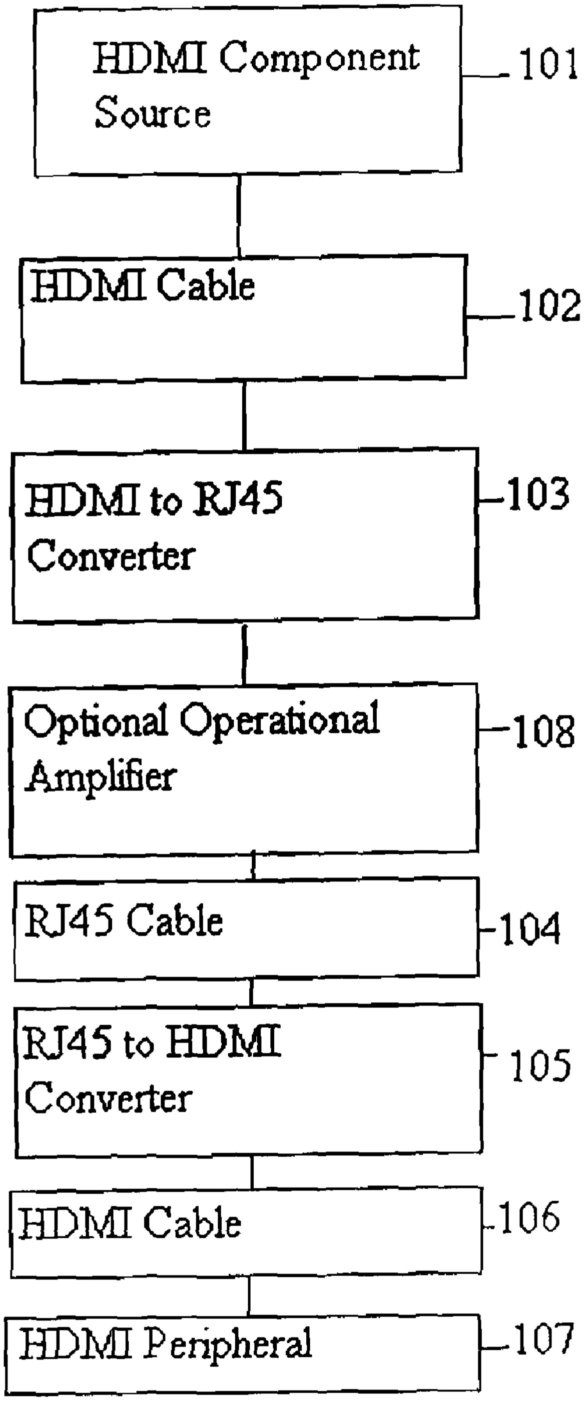
FIG. 1 is a block diagram of the system of the invention.

FIG. 1 is a block diagram of the system of the invention. The component source is the source of the HDMI signal. Component source 101 may be a computer, specifically, the video output of a computer. Component source 101 may also be a DVD player, a television set, or VCR, in short, any thing that is capable of producing a signal under the HDMI standard. Component source 101 typically delivers the signal through a standard DVD jack, although a direct connection to a HDMI cable is also possible. One end of a HDMI cable 102 connects to the output of component source 101. Cable 102 is typically a nineteen (19) wire cable adapted specifically for transmission of HDMI signals. The other end of cable 102 connects to a converter 103. The connection of cable 102 to converter 103 may be done through an HDMI plug and HDMI jack or may be direct. Converter 103 separates the nineteen input signal into a plurality of signals suitable for twisted pair cables. In the preferred embodiment, converter 103 does not include any active components. In the preferred embodiment, converter 103 outputs to three RJ45 jacks. A plurality of twisted pair cables 104 have one end connected to converter 103. In the preferred embodiment, three category 5 cables each having four twisted pairs are used for cable 104. For a greater bandwidth, category 5E, category 6 or an optimized cable should be used. The other end of cables 104 connect to the input of a second converter 105. In the preferred embodiment, converter 105 is identical to converter 103 reversed. The output of converter 105 connects to an HDMI cable 106. HDMI cable 106 connects to a peripheral 107. Peripheral 107 may be a video monitor or any device having an HDMI input. In an optional embodiment, an operational amplifier 108 such as a 941 OP Amp is placed between converter 103 and cables 104 to boost signal strength.

Figure 2:
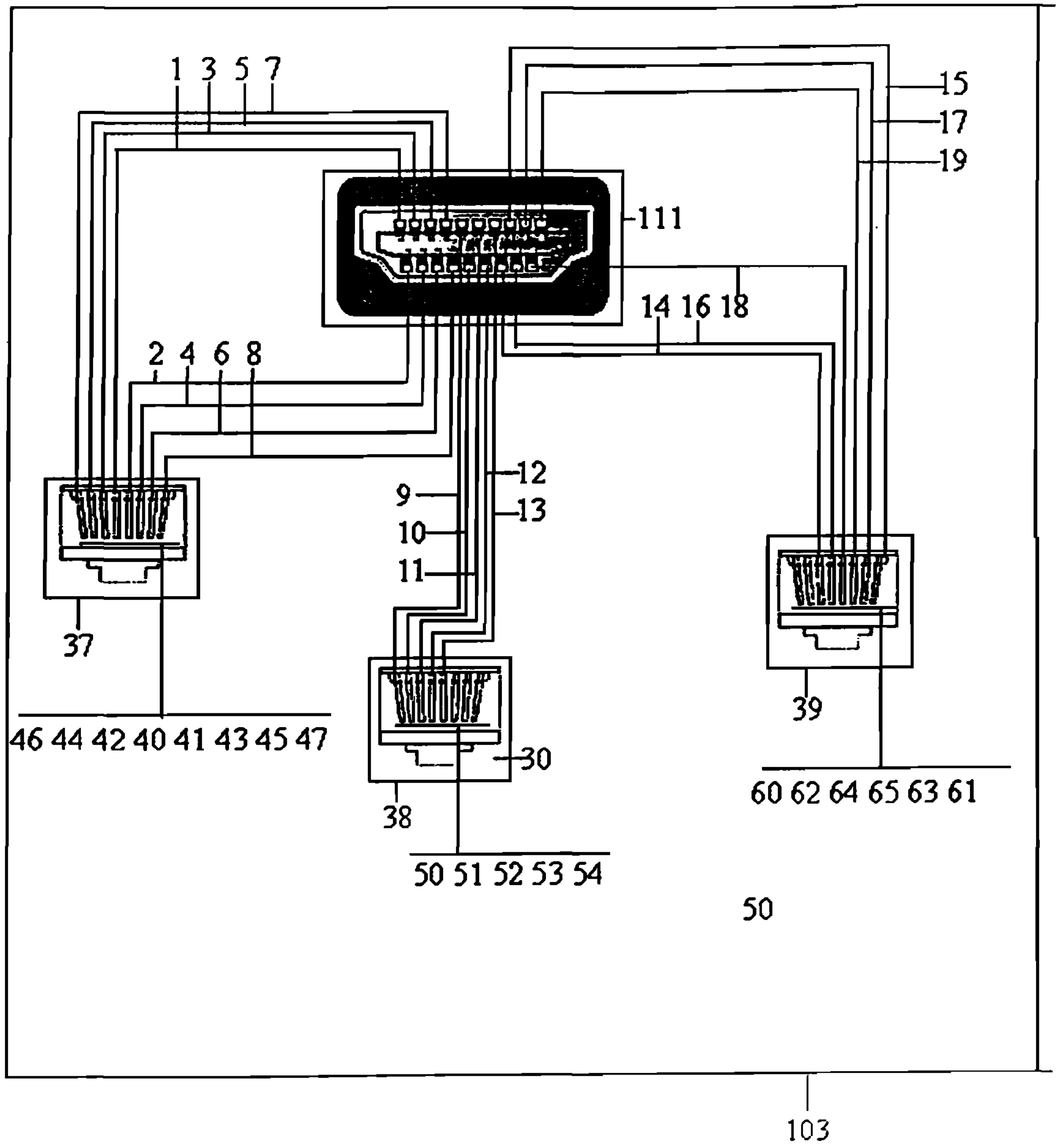
FIG. 2 is a top plan view of converter 103 of the invention.

FIG. 2 is a top plan view of converter 103 of the invention. A printed circuit board 50 forms the body of converter 103. Converter 103 includes an HDMI jack 111 mounted to printed circuit board 50 for inputting an HDMI signal. An HDMI-D Female Receptacle such as those made by Molex has been found suitable for jack 111 but other equivalent jacks could be used in either a male or female embodiment. Jack 111 includes nineteen pin receptacles 1-19. Three output jacks 37, 38, and 39 are also mounted to printed circuit board 50 included on converter 103. Molex CATS Jack w/internal shield #855070001 has been found suitable for use as output jacks 37, 38, and 39. Each of output jacks 37, 38, and 39 include 8 pins 40-47, 5 pins 50-54 and 6 pins 60-65, respectively. It is worth noting that the correspondence between particular pins and individual wires is a matter of design preference only and is not by way of limitation or to the exclusion of other wiring alternatives as an 8 wire, 8 wire, 3 wire alternative is an equally operable variant. Board 50 connects pin 1 of input HDMI jack 111 to pin 40 of output jack 37. The remaining pins are connected as shown in the following table.

TABLE 1

| |
|---|
| Jack 37 pin 40 to HDMI jack 11 pin 1 TMDS Data2+ |
| Jack 37 pin 41 to HDMI jack 11 pin 2 TMDS Data2 Shield |
| Jack 37 pin 42 to HDMI jack 11 pin 3 TMDS Data2− |
| Jack 37 pin 43 to HDMI jack 11 pin 4 TMDS Data1+ |
| Jack 37 pin 44 to HDMI jack 11 pin 5 TMDS Data1 Shield |
| Jack 37 pin 45 to HDMI jack 11 pin 6 TMDS Data1− |
| Jack 37 pin 46 to HDMI jack 11 pin 7 TMDS Data0+ |
| Jack 37 pin 47 to HDMI jack 11 pin 8 TMDS Data0 Shield |
| Jack 38 pin 50 to HDMI jack 11 pin 9 TMDS Data0− |
| Jack 38 pin 51 to HDMI jack 11 pin 10 TMDS Clock+ |
| Jack 38 pin 52 to HDMI jack 11 pin 11 TMDS Clock Shield |
| Jack 38 pin 53 to HDMI jack 11 pin 12 TMDS Clock− |
| Jack 38 pin 54 to HDMI jack 11 pin 13 CEC (not used) |
| Jack 39 pin 60 to HDMI jack 11 pin 14 Reserved (N.C. on device) |
| Jack 39 pin 61 to HDMI jack 11 pin 15 SCL |
| Jack 39 pin 62 to HDMI jack 11 pin 16 SDA |
| Jack 39 pin 63 to HDMI jack 11 pin 17 DDC/CEC Ground |
| Jack 39 pin 64 to HDMI jack 11 pin 18 +5 V Power |
| Jack 39 pin 65 to HDMI jack 11 pin 19 Hot Plug Detect |

A modified converter 103 may be mounted in a wall socket (not shown) with HDMI jack 111 reversed pointing into the room and jacks 37, 38, and 39 directed toward the wall. Long cables (not shown) running through walls can connect two such converters to allow an unobtrusive remote monitor in a building. HDMI cables (not shown) are pigtails connecting to source (not shown) and output (not shown) respectively.

Figure 3:
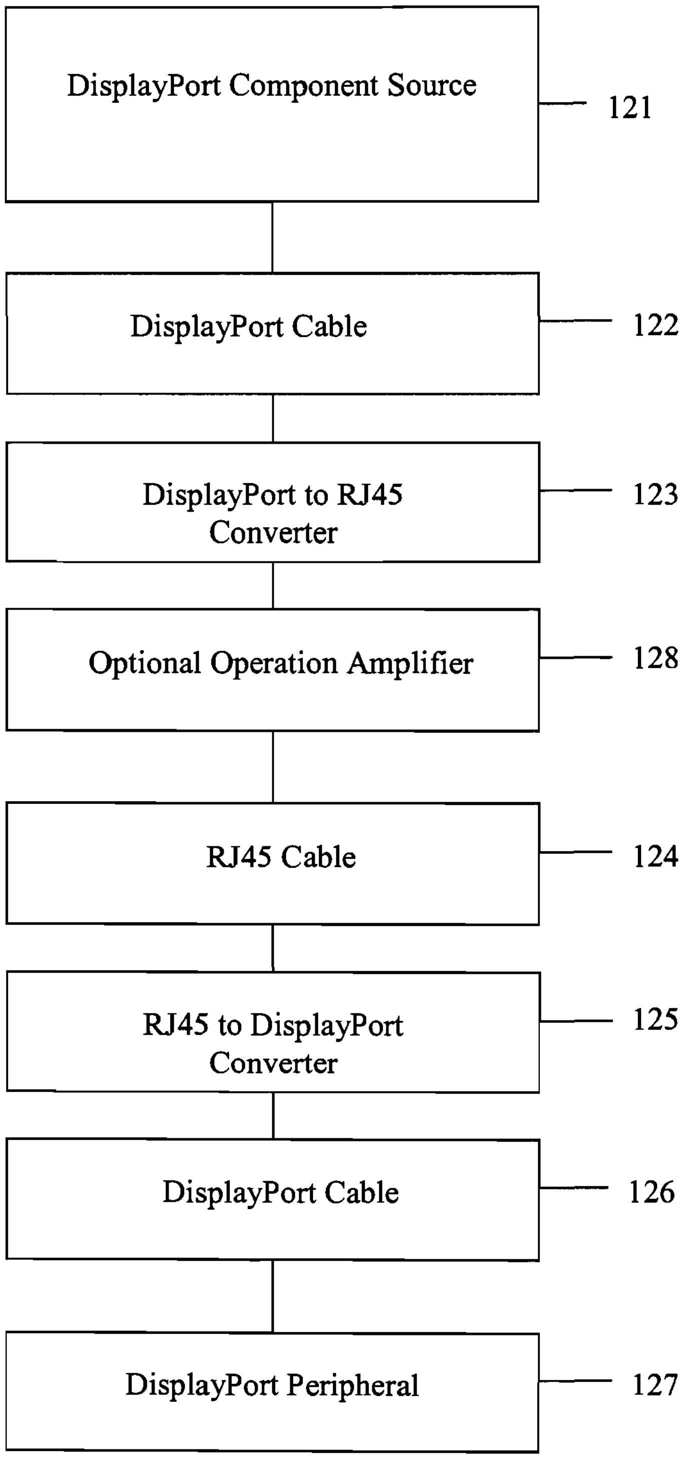
FIG. 3 is a block diagram of the system of the invention.

FIG. 3 is a block diagram of an additional embodiment of the system of the invention. The component source is the source of the wide bandwidth digital DisplayPort signal, a simplified standard digital display common interface. Component source 121 may be a computer, specifically, the video output of a computer. Component source 121 may also be a DVD player, a television set, or VCR, in short, any thing that is capable of producing a signal under the DisplayPort standard. Component source 121 typically delivers the signal through a standard DVD jack, although a direct connection to a DisplayPort cable is also possible. One end of a DisplayPort cable 122 connects to the output of component source 121. The other end of cable 122 connects to a converter 123. The connection of cable 122 to converter 123 may be done through a DisplayPort plug and DisplayPort jack or may be direct. Converter 123 converts the input signal into a plurality of signals suitable for twisted pair cables. In the preferred embodiment, converter 123 does not include any active components. In the preferred embodiment, converter 123 outputs to three RJ45 jacks. A plurality of twisted pair cables 124 have one end connected to converter 123. In the preferred embodiment, three category 5 cables each having four twisted pairs are used for cable 124. For a greater bandwidth, category 5E, category 6 or an optimized cable should be used. The other end of cables 124 connect to the input of a second converter 125. In the preferred embodiment, converter 125 is identical to converter 123 reversed. The output of converter 125 connects to an DisplayPort cable 126. DisplayPort cable 126 connects to a peripheral 127. Peripheral 127 may be a video monitor or any device having a DisplayPort input. In an optional embodiment, an operational amplifier 128 such as a 941 OP Amp is placed between converter 123 and cables 124 to boost signal strength.

Figure 4:
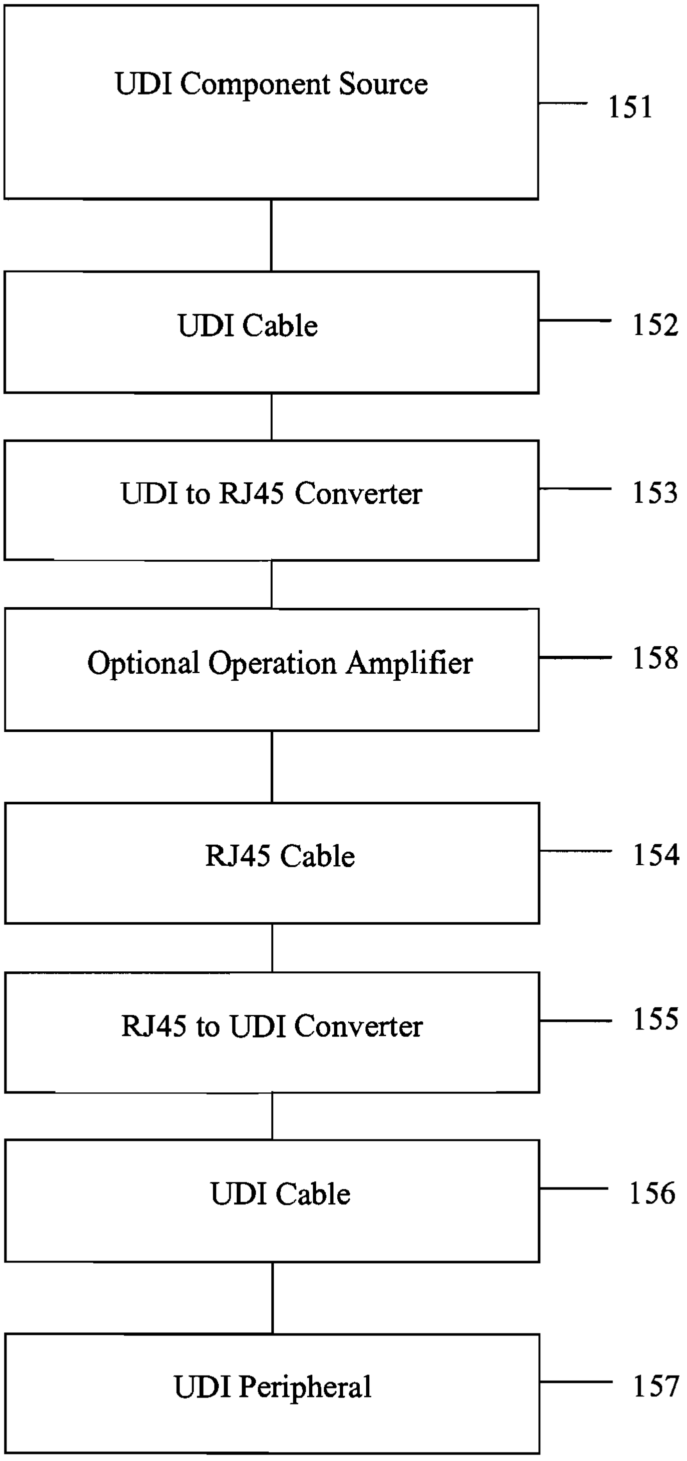
FIG. 4 is a block diagram of the system of the invention.

FIG. 4 is a block diagram of an additional embodiment of the system of the invention. The component source is the source of the wide bandwidth digital UDI signal, a standard digital display interface signal. Component source 151 may be a computer, specifically, the video output of a computer. Component source 151 may also be a DVD player, a television set, or VCR, in short, any thing that is capable of producing a signal under the UDI standard. Component source 151 typically delivers the signal through a standard DVD jack, although a direct connection to a UDI cable is also possible. One end of a UDI cable 152 connects to the output of component source 151. The other end of cable 152 connects to a converter 153. The connection of cable 152 to converter 153 may be done through a UDI plug and UDI jack or may be direct. Converter 153 converts the input signal into a plurality of signals suitable for twisted pair cables. In the preferred embodiment, converter 153 does not include any active components. In the preferred embodiment, converter 153 outputs to three RJ45 jacks. A plurality of twisted pair cables 154 have one end connected to converter 153. In the preferred embodiment, three category 5 cables each having four twisted pairs are used for cable 124. For a greater bandwidth, category 5E, category 6 or an optimized cable should be used. The other end of cables 154 connect to the input of a second converter 155. In the preferred embodiment, converter 155 is identical to converter 153 reversed. The output of converter 155 connects to an UDI cable 156. UDI cable 156 connects to a peripheral 157. Peripheral 157 may be a video monitor or any device having a UDI input. In an optional embodiment, an operational amplifier 158 such as a 941 OP Amp is placed between converter 153 and cables 154 to boost signal strength.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims, in which reference to an element in the singular is not intended to mean "one and only one" unless explicitly so stated, but rather "one or more". The inventions illustratively disclosed herein may be practiced without any element which is not specifically disclosed herein.

What is claimed is:

1. A system for linking a wide bandwidth digital signal producing device to a peripheral device comprising:

a first connection means for connecting the output of said wide bandwidth digital signal producing device to a first wide bandwidth digital signal cable;

a first converter for separating the wide bandwidth digital signal input into a plurality of outputs without altering the signal content;

a plurality of cables each having one end connected to each of said outputs of said first converter;

a second converter for recombining the signal received from the other end of each of said cables into a wide bandwidth digital signal output connected with a second connecting means; and a second wide bandwidth digital signal cable for connecting the output of said second converter to a peripheral device.

2. A system for linking a wide bandwidth digital signal producing device to a peripheral device as in claim 1, further comprising on the second converter at least one more connection means for connecting said cable to said peripheral device.

3. A system for linking a wide bandwidth digital signal producing device to a peripheral device as in claim 1, further comprising an operational amplifier connecting said first converter to said cables.

4. A system for linking a wide bandwidth digital signal producing device to a peripheral device as in claim 1, wherein said plurality of cables are each comprised of a plurality of twisted pairs.

5. A system for linking a wide bandwidth digital signal producing device to a peripheral device as in claim 4, wherein there are four pairs in each of said plurality of cables.

6. A system for linking a wide bandwidth digital signal producing device to a peripheral device as in claim 4, wherein there are three of such twisted pair cables.

7. A system for linking a wide bandwidth digital signal producing device to a peripheral device as in claim 4, wherein there are three of such twisted pair cables and they are category 5 cables.

8. A system for linking a wide bandwidth digital signal producing device to a peripheral device comprising:

a first connection means for connecting the output of said wide bandwidth digital signal producing device to a first wide bandwidth digital signal cable;

a first converter for separating the wide bandwidth digital signal received from the first digital signal cable into a plurality of outputs without altering the signal content;

a plurality of cables each having one end connected to each of said outputs of said first converter;

a second converter for recombining the signal received from the other end of each of said plurality of cables into a wide bandwidth digital signal output connected with two or more connecting means; and a plurality of wide bandwidth digital signal cables for connecting the output of said second converter two or more connecting means to one or more peripheral device.

9. A system for linking a wide bandwidth digital signal producing device to a peripheral device as in claim 8, further comprising an operational amplifier connecting said first converter to said plurality of cables.

10. A system for linking a wide bandwidth digital signal producing device to a peripheral device as in claim 8, wherein said plurality of cables are each comprised of a plurality of twisted pairs.

11. A system for linking a wide bandwidth digital signal producing device to a peripheral device comprising:

a first connection means for connecting the output of said wide bandwidth digital signal producing device to a first wide bandwidth digital signal cable;

a first converter for separating the wide bandwidth digital signal received from the first digital signal cable into a plurality of outputs without altering the signal content;

a plurality of twisted pair cables each having one end connected to each of said outputs of said first converter;

a second converter for recombining the signal received from the other end of each of said twisted pair cables into a wide bandwidth digital signal output connected with two or more connecting means; and a plurality of wide bandwidth digital signal cables for connecting the output of said second converter two or more connecting means to one or more peripheral device.

12. A system for linking a wide bandwidth digital signal producing device to a peripheral device as in claim 11, further comprising an operational amplifier connecting said first converter to said plurality of twisted pair cables.

* * * * *